US012668426B2

(12) United States Patent
Roth et al.

(10) Patent No.: US 12,668,426 B2
(45) Date of Patent: Jun. 30, 2026

(54) SYSTEMS AND METHODS FOR TRANSFERRING ITEMS USING MULTIPLE ROBOTIC DEVICES

(71) Applicant: Walmart Apollo, LLC, Bentonville, AR (US)

(72) Inventors: Brian C. Roth, Bentonville, AR (US); Paul E. Durkee, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 680 days.

(21) Appl. No.: 18/016,910

(22) PCT Filed: Jul. 27, 2021

(86) PCT No.: PCT/US2021/070968
§ 371 (c)(1),
(2) Date: Jan. 19, 2023

(87) PCT Pub. No.: WO2022/027000
PCT Pub. Date: Feb. 3, 2022

(65) Prior Publication Data
US 2023/0348190 A1 Nov. 2, 2023

Related U.S. Application Data

(60) Provisional application No. 63/057,985, filed on Jul. 29, 2020.

(51) Int. Cl.
B65G 1/137 (2006.01)
B25J 9/02 (2006.01)
(Continued)

(52) U.S. Cl.
CPC ......... B65G 1/1375 (2013.01); B65G 47/905 (2013.01); G06Q 10/08 (2013.01); B25J 9/023 (2013.01); B25J 9/06 (2013.01)

(58) Field of Classification Search
CPC ............... B65G 1/1375; B65G 47/905; G06Q 30/0601; G06Q 10/08
See application file for complete search history.

(56) References Cited

U.S. PATENT DOCUMENTS 5,363,310 A    11/1994 Haj-Ali-Ahmadi
5,395,206 A    3/1995 Cerny, Jr.
(Continued)

FOREIGN PATENT DOCUMENTS

EP        3235606 A1    10/2017
JP     2020038116 A  *  3/2020
(Continued)

OTHER PUBLICATIONS

JP-2020038116-A (Year: 2020).*
(Continued)

*Primary Examiner* — Ernesto A Suarez
*Assistant Examiner* — Laurence R Brothers
(74) *Attorney, Agent, or Firm* — Fitch, Even, Tabin & Flannery LLP

(57) ABSTRACT

There are provided systems and methods for picking up and transferring different types of merchandise. In one form, the system includes: a shopping facility with a merchandise order assembly area; an automated retrieval system to transport merchandise to the assembly area; a first robotic device at the assembly area for picking up and moving a first set of merchandise items; a second robotic device at the assembly area for picking up and moving a second set of merchandise items; and a merchandise database identifying the first and second sets of merchandise items. The system also includes a control circuit configured to: receive the merchandise order, identify a merchandise item being transported to the assembly area, determine the category of merchandise item, (Continued)

and direct the merchandise item to the first or second robotic device or a manual transfer area.

22 Claims, 9 Drawing Sheets

(51) Int. Cl.

| | |
|---|---|
| *B25J 9/06* | (2006.01) |
| *B65G 47/90* | (2006.01) |
| *G06Q 10/08* | (2024.01) |
| *G06Q 30/0601* | (2023.01) |

(56) References Cited

U.S. PATENT DOCUMENTS

| | | | |
|---|---|---|---|
| 6,289,260 | B1 | 9/2001 | Bradley |
| 6,505,093 | B1 | 1/2003 | Thatcher |
| 7,110,855 | B2 | 9/2006 | Leishman |
| 7,809,467 | B2 | 10/2010 | Schaefer |
| 8,326,679 | B1 | 12/2012 | Rowe |
| 8,335,585 | B2 | 12/2012 | Hansl |
| 8,559,699 | B2 | 10/2013 | Boca |
| 8,682,751 | B1 | 3/2014 | Antony |
| 9,008,827 | B1 | 4/2015 | Dwarakanath |
| 9,050,719 | B2 | 6/2015 | Valpola |
| 9,092,698 | B2 | 7/2015 | Buehler |
| 9,457,474 | B1 | 10/2016 | Lisso |
| 9,561,587 | B2 | 2/2017 | Wellman |
| 9,604,358 | B1 | 3/2017 | Brazeau |
| 9,611,097 | B2 | 4/2017 | Lert |
| 9,623,558 | B1 | 4/2017 | Stubbs |
| 9,987,746 | B2 | 6/2018 | Bradski |
| 10,035,649 | B2 | 7/2018 | Lert |
| 10,087,021 | B2 | 10/2018 | Doke |
| 10,360,531 | B1 * | 7/2019 | Stallman .............. G06Q 10/087 |
| 10,471,599 | B1 | 11/2019 | Guerin |
| 12,351,394 | B2 | 7/2025 | Roth |
| 2002/0067984 | A1 | 6/2002 | Guenzi |
| 2008/0025833 | A1 | 1/2008 | Baker |
| 2012/0253507 | A1 * | 10/2012 | Eldershaw ............. G06Q 10/08 901/14 |
| 2013/0234852 | A1 | 9/2013 | Sena |
| 2013/0317642 | A1 | 11/2013 | Asaria |
| 2013/0340682 | A1 * | 12/2013 | Bareket ................... A01J 5/017 119/14.08 |
| 2015/0332213 | A1 | 11/2015 | Galluzzo |
| 2016/0167228 | A1 | 6/2016 | Wellman |
| 2017/0286708 | A1 * | 10/2017 | Erhart ..................... G06F 21/56 |
| 2018/0092304 | A1 | 4/2018 | Moore |
| 2018/0244473 | A1 | 8/2018 | Mathi |
| 2018/0284760 | A1 * | 10/2018 | Gupta ..................... G06F 3/011 |
| 2019/0041868 | A1 | 2/2019 | Cantrell |
| 2019/0095854 | A1 * | 3/2019 | Pandya ............... B65G 1/0492 |
| 2019/0127099 | A1 | 5/2019 | Langen |
| 2020/0087068 | A1 | 3/2020 | Hance |
| 2020/0130189 | A1 | 4/2020 | Ghanem |
| 2020/0346351 | A1 | 11/2020 | Edwards |
| 2022/0306387 | A1 | 9/2022 | Roth |

FOREIGN PATENT DOCUMENTS

| | | |
|---|---|---|
| WO | 2020257389 | 12/2020 |
| WO | 2022027000 | 2/2022 |

OTHER PUBLICATIONS

Oracle; "Oracle Warehouse Management Outbound Logistics"; https://docs.oracle.com/cd/E18727_01/doc.121/e13433/T211976T317987.htm#zzbegin; 2010; pp. 1-44.

Guérin, Joris, et al. "Unsupervised robotic sorting: Towards autonomous decision making robots"; arXiv preprint arXiv:1804.04572; 2018.

Krainin, Michael, et al.; "Manipulator and Object Tracking for In Hand Model Acquisition"; Proceedings, IEEE International Conference on Robots and Automation; 2010; pp. 1817-1824.

Mahler, Jeffrey, et al.; "Learning deep policies for robot bin picking by simulating robust grasping sequences"; Conference on robot learning. 2017.

Pinto, Andry Maykol, et al.; "Object recognition using laser range finder and machine learning techniques"; Robotics and Computer-Integrated Manufacturing 29.1 (2013): 12-22.

Premebida, Cristiano, et al.; "Intelligent robotic perception systems"; Applications of Mobile Robots; 2018; pp. 1-16.

Jones, Brad; "This Robot Can Pick Up Objects and Recognize What They Are"; Futurism; https://futurism.com/robot-picks-objects-recognize; Feb. 21, 2018; pp. 1-6.

Arbulu, Mario et al.; "Cartesian robot motion embedded on Logistics Process, screws approach"; 2012 IEEE International Conference on Robotics and Biomimetics (ROBIO); Dec. 2012; pp. 1-6.

PCT; App No. PCT/US2021/070968; International Search Report and Written Opinion mailed Nov. 15, 2021.

PCT; App No. PCT/US2021/070968; International International Preliminary Report on Patentability mailed Nov. 15, 2021; pp. 1-10.

* cited by examiner

100

148

124

144

146

145

150

Merchandise
database

SYSTEMS AND METHODS FOR TRANSFERRING ITEMS USING MULTIPLE ROBOTIC DEVICES

CROSS-REFERENCE TO RELATED APPLICATION

This application is a U.S. national stage application of International Application No. PCT/US2021/070968, filed Jul. 27, 2021, designating the United States, which claims the benefit of U.S. Provisional Application No. 63/057,985, filed Jul. 29, 2020, which is incorporated by reference in its entirety herein.

TECHNICAL FIELD

This invention relates generally to robotic devices, and more particularly, to robotic devices used to pick up and transfer a variety of types of merchandise items.

BACKGROUND

In the retail setting, customers are increasingly placing merchandise orders that are then assembled and made ready for pick up at shopping facilities. In this regard, it is desirable to be able to assemble the merchandise orders efficiently using an automated retrieval system. The automated retrieval system may collect some or all of the ordered merchandise in a storage area and then transport it to a merchandise order assembly area by a transport conveyance, such as by a conveyor assembly, a robotic vehicle, or an autonomous ground vehicle.

Once some or all of the ordered merchandise has been transported to the merchandise order assembly area, it may then be transferred to a merchandise order container for eventual pick up by the customer or delivery to the customer. In this regard, it is desirable to use multiple robotic devices in an automated system to transfer the arriving merchandise items to the merchandise order container. It is desirable to use multiple robotic devices that can handle merchandise of different sizes, shapes, and weight. There is a need for an automated system using multiple robotic devices that are intended to transfer specific types of merchandise items.

BRIEF DESCRIPTION OF THE DRAWINGS

Disclosed herein are embodiments of systems, apparatuses and methods for transferring a variety of different types of merchandise, such as at shopping facilities. This description includes drawings, wherein.

Figure 1:
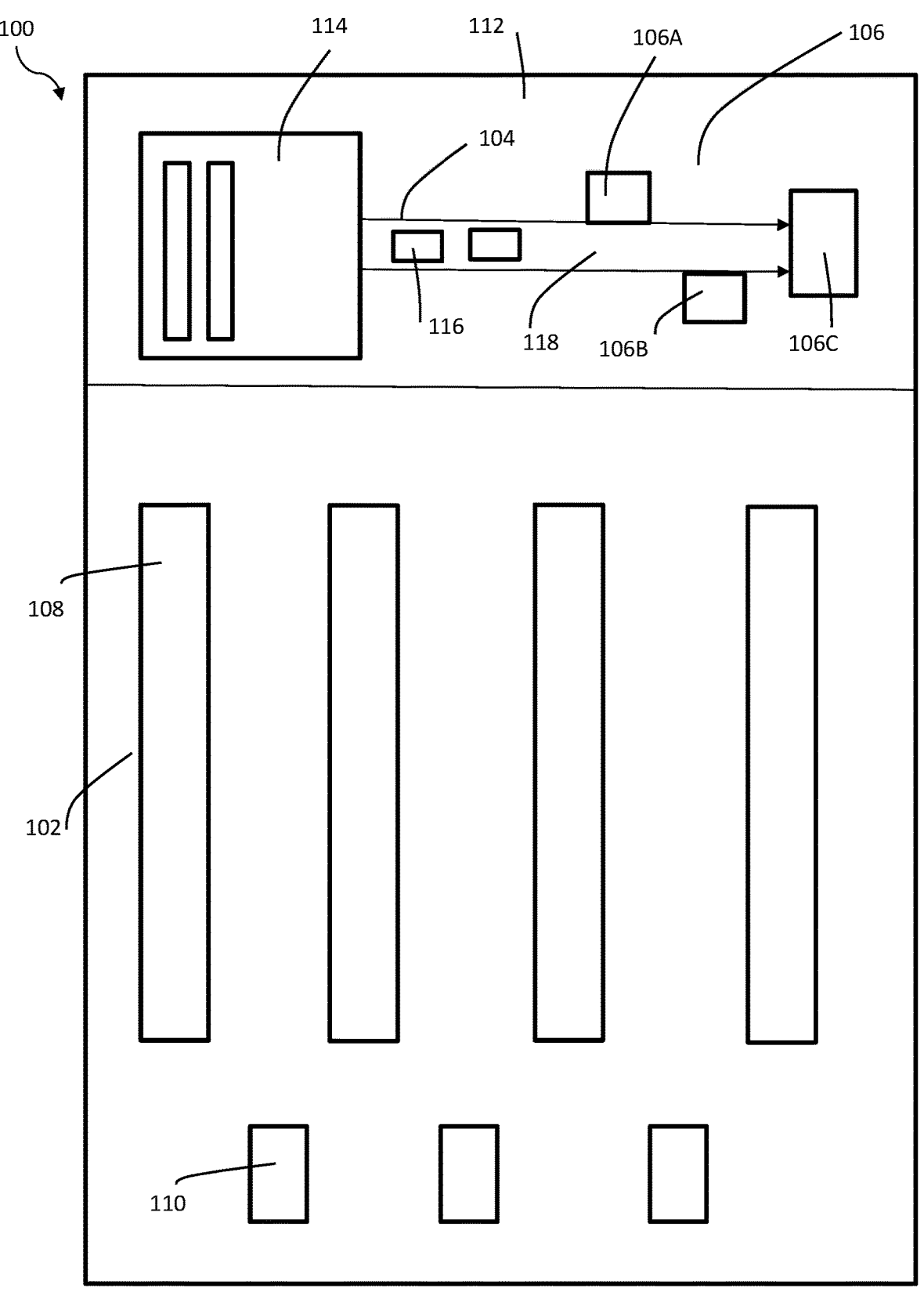
FIG. 1 is a schematic diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein using robotic devices for picking up and transferring a variety of different types of merchandise in shopping facilities. In one form, the system includes: a shopping facility comprising at least one merchandise order assembly area configured for assembly of part or all of a merchandise order; an automated retrieval system configured to transport merchandise to the at least one merchandise order assembly area; a first robotic device at the at least one merchandise order assembly area configured to pick up and move a first set of merchandise items; a second robotic device at the at least one merchandise order assembly area configured to pick up and move a second set of merchandise items; and a merchandise database containing a plurality of records of merchandise at the shopping facility, the plurality of records identifying the first set of merchandise items identified as transferable by the first robotic device, the second set of merchandise items identified as transferable by the second robotic device, and a third set of merchandise items identified for manual transfer. The system also includes a control circuit communicatively coupled to first robotic device, the second robotic device, and the merchandise database, the control circuit configured to: receive the merchandise order; identify a merchandise item being transported to the merchandise order assembly area; determine, from the merchandise database, if the merchandise item is in the first set, second set, or third set of items; if the merchandise item is in the first set of items, direct the merchandise item to the first robotic device; if the merchandise item is in the second set of items, direct the merchandise item to the second robotic device;

and if the merchandise item is in the third set of items, direct the merchandise item to a manual transfer area.

In some implementations, in the system, the first robotic device comprises a robotic arm and the first set of merchandise items comprises items less than at least one of a predetermined size and a predetermined weight. In some implementations, the second robotic device comprises a cartesian robot with a mount for interchangeably affixing a plurality of end effectors and the second set of merchandise items comprises items exceeding at least one of a predetermined size and a predetermined weight. In some implementations, the system further includes at least one image sensor configured to capture images of each of the merchandise items being transported to the at least one merchandise order assembly area. In some implementations, the automated retrieval system includes: a plurality of containers configured to contain merchandise in a merchandise storage area in the shopping facility; and a transport conveyance configured to transport containers between the merchandise storage area and the merchandise order assembly area. In some implementations, the transport conveyance includes at least one of a conveyor assembly and an autonomous ground vehicle. In some implementations, the control circuit is configured to: determine whether transfer of a merchandise item in the first set of items by the first robotic device was successfully completed; and if the merchandise item was not successfully transferred by the first robotic device, direct the merchandise item to the second robotic device. In some implementations, the control circuit is configured to: determine whether transfer of the merchandise item by the second robotic device was successfully completed; and if the merchandise item was not successfully transferred by the second robotic device, direct the merchandise item to the manual transfer area. In some implementations, the control circuit is configured to: if the merchandise item in the first set of items was successfully transferred by the second robotic device, reassign the merchandise item to the second set of items; and if the merchandise item in the first set of items was not successfully transferred by either the first or the second robotic device, reassign the merchandise item to the third set of merchandise items. In some implementations, the control circuit is configured to: determine whether transfer of a merchandise item in the second set of items by the second robotic device was successfully completed; and if the merchandise item was not successfully transferred by the second robotic device, direct the merchandise item to the manual transfer area and reassign the merchandise item to the third set of merchandise items. In some implementations, the control circuit is configured to: determine the merchandise items that are in each category of the first set, the second set, and the third set of merchandise items; instruct transport of each item of the first set of items to the at least one merchandise order assembly area; following transport of each item of the first set of items, instruct transport of each of the second set of items to the at least one merchandise order assembly area; and following transport of each item of the first and second sets of items, instruct transport of each item of the third set of items to the at least one merchandise order assembly area. In some implementations, the second set of merchandise items further comprises merchandise items with a predetermined packaging material or a predetermined threshold of fragility. In some implementations, the plurality of end effectors comprises at least two end effectors selected from suction cups or arrays, grippers, hooks, or magnets.

In another form, there is provided a method for picking up and transferring a variety of different types of merchandise in shopping facilities, the method including: providing a shopping facility comprising at least one merchandise order assembly area configured for assembly of part or all of a merchandise order; by an automated retrieval system, transporting merchandise to the at least one merchandise order assembly area; by a first robotic device at the at least one merchandise order assembly area, picking up and moving a first set of merchandise items, the first robotic device comprising a robotic arm and the first set of merchandise items comprising items less than at least one of a predetermined size and a predetermined weight; by a second robotic device at the at least one merchandise order assembly area, picking up and moving a second set of merchandise items, the second robotic device comprising a cartesian robot with a mount for interchangeably affixing a plurality of end effectors and the second set of merchandise items comprising items exceeding at least one of the predetermined size and the predetermined weight; storing in a merchandise database a plurality of records of merchandise at the shopping facility, the plurality of records identifying the first set of merchandise items identified as transferable by the first robotic device, the second set of merchandise items identified as transferable by the second robotic device, and a third set of merchandise items identified for manual transfer; and by a control circuit: receiving the merchandise order; identifying a merchandise item being transported to the merchandise order assembly area; determining, from the merchandise database, that the merchandise item is in the first set, second set, or third set of items; directing merchandise items in the first set of items to the first robotic device; directing merchandise items in the second set of items to the second robotic device; and directing merchandise items in the third set of items to a manual transfer area.

This disclosure relates to an automated retrieval system, or an automated storage and retrieval system, that automatically retrieves various types of merchandise/products. In general, it involves a system employing a secondary robotic device that can move a product from a storage container (or tote or bin) to an order container when the product in question has unique characteristics such that it cannot be processed by a primary robot, which is designed to handle most types of products. For example, the primary robot may not be able to handle a type of product (an outlier item) due to one or more of several characteristics, such as total size, weight, shape, packaging material, fragility, etc.

It is generally contemplated that the system handles nearly all of the product assortment with a primary robot and handles most of the remainder with a secondary robot. Further, it is generally contemplated that this approach may include a vision system and product identification capability. In one form, the primary robot may be a six-axis robotic arm (possibly with a gripper or suction as an end effector), but these primary robots may have issues picking up large/heavy or otherwise unique items. For storage containers containing these outlier items, upon receipt of a customer order, the order containers may be processed first through the primary robot area for moving most of the product from the storage containers to the order containers. Either partially filled order containers or empty additional order containers may be presented to the secondary robot, along with the storage containers. In one form, an appropriate end effector may be affixed to the secondary robot, which then moves the outlier product from the storage container to the order container. The containers from the primary and secondary robots (as well as possibly containers from a manual transfer area) may then be combined for presentation to the customer.

The items requiring the secondary, cartesian robot with a specialized end effector may be identified by attributes in the product's item file/merchandise database. Examples of such attributes are size, shape, weight, and being unpickable due to packaging on the merchandise, such as a paper wrapper. The item file may explicitly define which robot and which end effector to use. Alternatively, the system controlling the order filling process may determine which robot and end effector is required based on other, already-existing attributes. This alternative approach may allow for a machine learning process to exist independent of the item file database so the picking system can be continuously improved. The machine learning process may use percentage failure rates for a given type of product. When failure rates exceed a certain threshold for products with similar attributes, a new end effector (pick head) may be called for that product.

In one context, this automated system employing robotic device(s) may be used in a retail setting. For example, the robotic device(s) may be used in a shopping facility as part of an approach for receiving merchandise orders from customers and then assembling them for pick up by or delivery to customers. In this example, it is contemplated that some or all of the merchandise may be transported to a merchandise order assembly area in the shopping facility where it may then be transferred to one or more order totes or containers, which will eventually be picked up by customers at the shopping facility (or possibly delivered to customers). The robotic device(s) may be used in the merchandise transfer process.

Referring to FIG. 1, there is shown part of a system 100 for picking up and transferring a variety of different types of merchandise at a shopping facility 102. It is generally contemplated that the system 100 uses at least two robotic devices at the shopping facility 102 to pick up merchandise of various sizes, shapes, weight, etc. It is also contemplated that the merchandise may be transported using an automated retrieval system 104, and the at least two robotic devices are employed to move the merchandise to an order tote/container (such as for pick up by a customer).

The system 100 includes a shopping facility 102 that includes a merchandise order assembly area 106 (that includes multiple assembly stations). It is generally contemplated that the shopping facility 102 may be any of various types of facilities at which merchandise is located, such as, for example, retail stores, self-serve vending locations, distribution centers storing merchandise, etc. FIG. 1 shows one example of a shopping facility 102 in the form of a retail store. This shopping facility 102 includes shelves/aisles 108 on which merchandise may be arranged and point-of-sale checkout areas 110 where purchase of merchandise may be completed.

The merchandise order assembly area 106 is configured for assembly of part or all of a merchandise order, which may be picked up by customers. In one form, this merchandise order assembly area 106 may be disposed in a separate backroom area 112 of the shopping facility 102. It is generally contemplated that merchandise may be transported to the merchandise order assembly area 106 by an automated retrieval system 104 and/or manually (such as by store employees). The merchandise order assembly area 106 may be of any of various sizes and arrangements so as to allow transfer of merchandise to order totes/containers for pick up customers. The merchandise order assembly area 106 may also serve as a customer pick up area at the shopping facility 102 or the customer pick up area may be at a different location (such as checkout areas 110).

The system 100 includes an automated retrieval system 104 that is configured to retrieve and transport merchandise to the merchandise order assembly area 106. It is contemplated that the automated retrieval system 104 may transport only a portion (and not necessarily all) of the merchandise being transported to the merchandise order assembly area 106. In this particular form, some or all of the merchandise may be transported from a merchandise storage area 114 to the merchandise order assembly area 106 in the backroom area 112 of the shopping facility 102.

The automated retrieval system 104 may include a plurality of containers (or storage totes) 116 configured to contain merchandise in a merchandise storage area 114 in the shopping facility 102. It may further include a transport conveyance 118 configured to transport the containers 116 between the merchandise storage area 114 and the merchandise order assembly area 106. In one form, the transport conveyance may be in the form of one or more conveyor assemblies 118.

Figure 2:
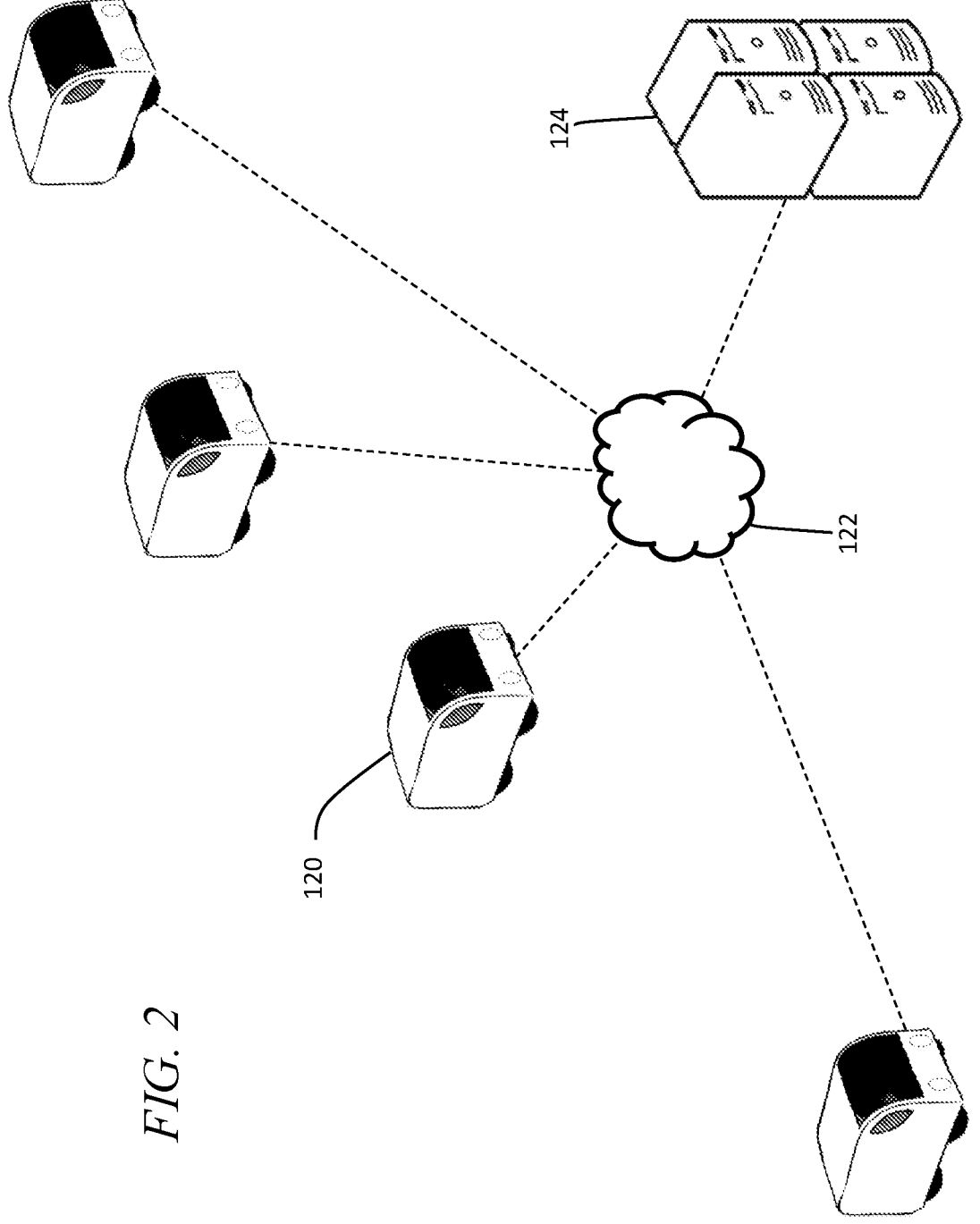
FIG. 2 is a schematic diagram in accordance with some embodiments.

Alternatively, or in addition to the conveyor assembl(ies), the transport conveyance 118 may employ one or more autonomous ground vehicles 120 to transport some or all of the merchandise. Referring to FIG. 2, there is shown an example in which multiple AGVs 120 move about the shopping facility 102 and operate autonomously. It is generally contemplated that the multiple AGVs 120 may travel back and forth between the merchandise storage area 114 and the merchandise order assembly area 106 at the shopping facility 102. Under this approach, to facilitate coordination of the AGVs 120 in transporting different merchandise, the AGVs 120 may communicate over a network 122. The system 100 may include a central computer system (or control circuit 124) at the shopping facility 102 accessible by one or more of the AGVs 120 over the network 122.

Figure 3:
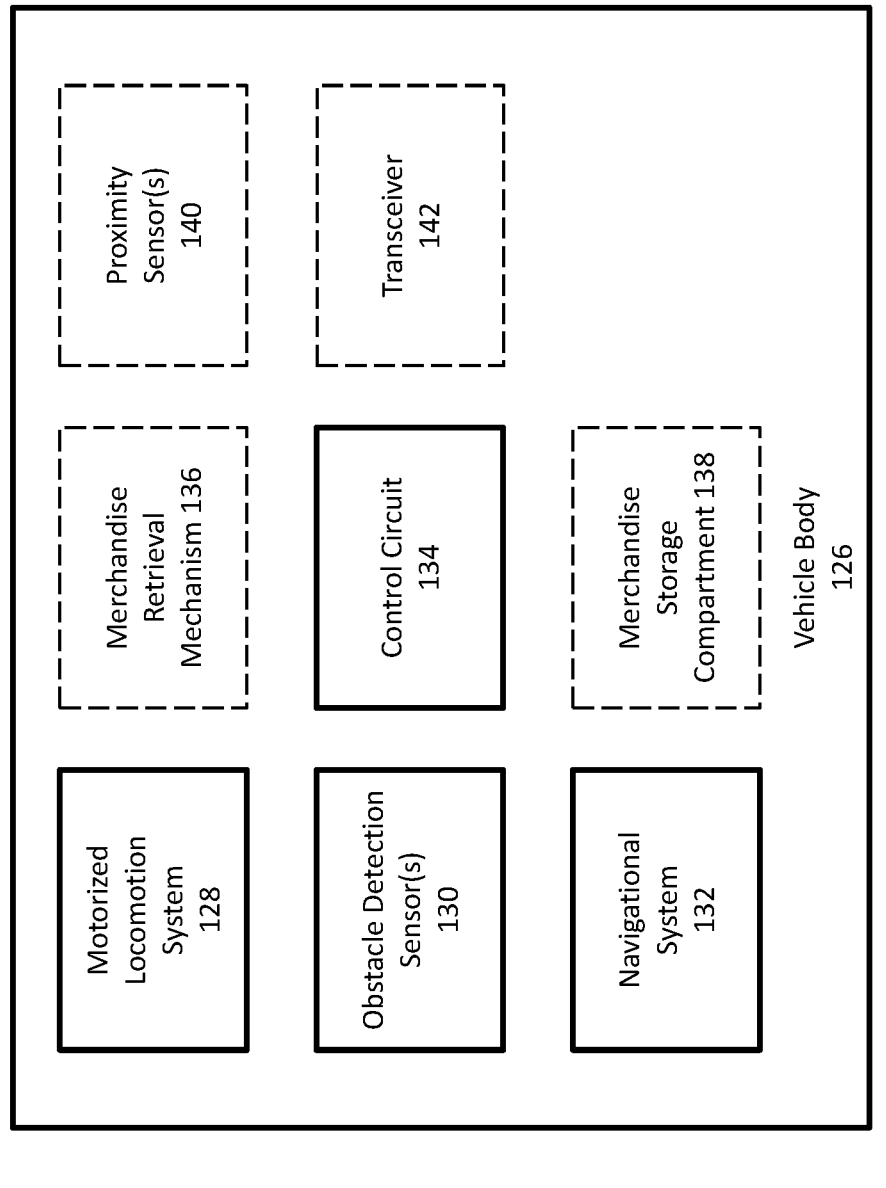
FIG. 3 is a block diagram in accordance with some embodiments.
Figure 3:

Referring now to FIG. 3, it is generally contemplated that the AGV 120 includes certain components in and about its vehicle body 126 that allow it to convey merchandise and to travel about the shopping facility 102. In one form, each AGV 120 includes a motorized locomotion system 128, at least one obstacle detection sensor 130, a navigational system 132, and an AGV control circuit 134. It is contemplated that the AGV 120 may also include other components, such as, without limitation, a merchandise retrieval mechanism 136, a merchandise storage compartment 138, proximity sensor(s) 140, and a transceiver 142. It is generally contemplated that the AGVs 120 are generally interchangeable with one another. Other types of robotic vehicles may also be used to transport merchandise to the merchandise order assembly area 106.

As shown in FIG. 1, it is generally contemplated that the merchandise order assembly area 106 includes multiple assembly stations for the transfer of merchandise items to order containers. In this particular example, it is contemplated that the first assembly station 106A is the first station along the conveyor assembly 118 and includes, supports, or houses the primary robot that is intended to handle most of the merchandise items. Next, a second assembly station 106B is disposed as the second station along the conveyor assembly 118 and includes, supports, or houses the secondary robot that is intended to handle the relatively few outlier items. Finally, a third assembly station 106C is disposed at the end of the conveyor assembly 118. This third assembly station 106C constitutes a manual transfer area where individuals transfer merchandise items that are not suitable for handling by either the primary or secondary robot or that may not be stored in the merchandise database. As should be understood, there are a number of possible different arrangements and positioning of assembly stations along a single conveyor assembly 118, along multiple conveyor assemblies 118, in different relative positions and accessible by other types of transport conveyances, or that are in one or more merchandise order assembly areas. It is contemplated that there may be multiple merchandise order assembly areas 106 (or stations) disposed about the shopping facility 102.

Figure 4:
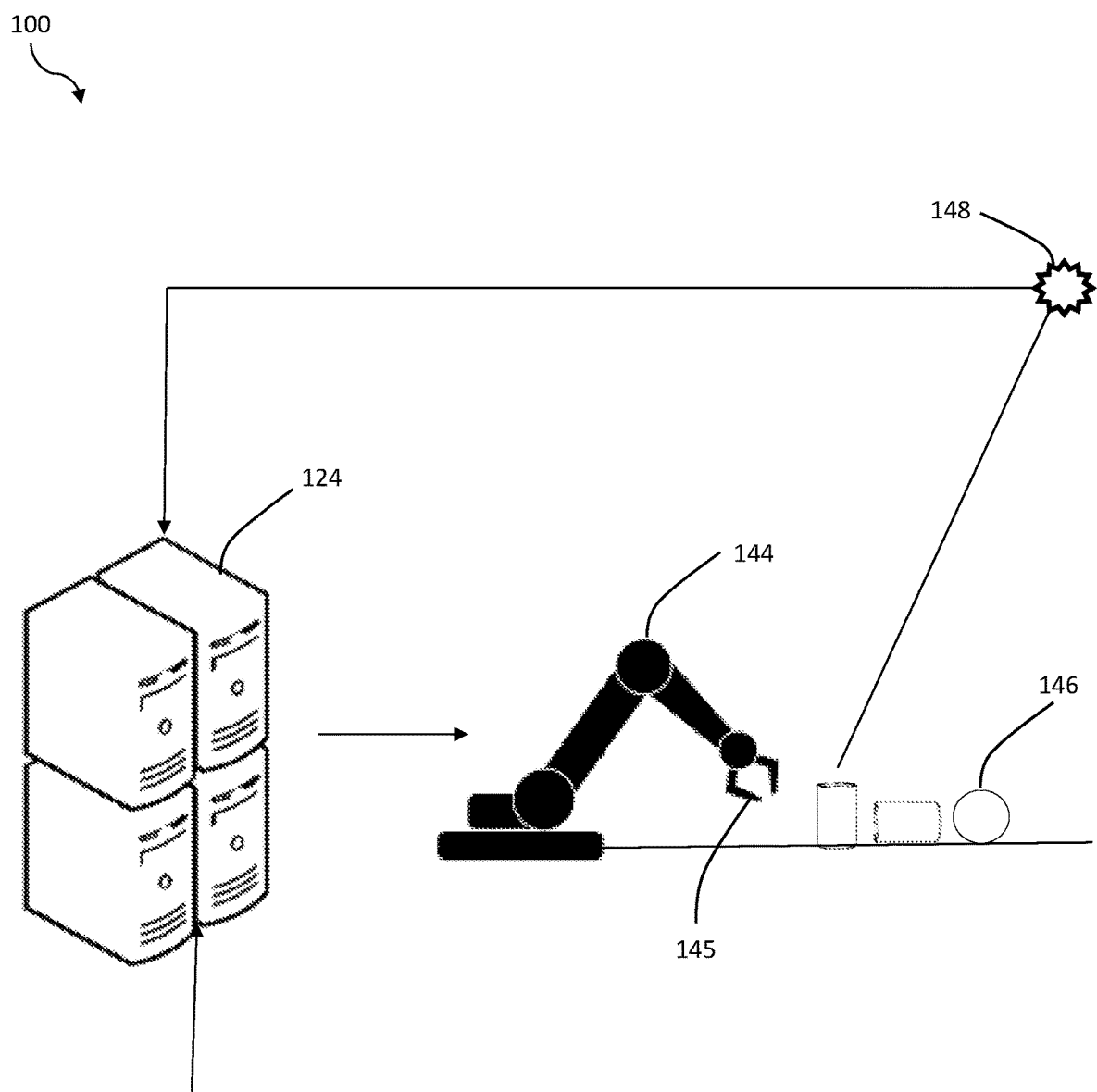
FIG. 4 is a schematic diagram in accordance with some embodiments.

Referring to FIG. 4, there is shown a schematic of part of the system 100 involving a first robotic device 144 and its interaction with certain other components of the system 100. It is generally contemplated that the first robotic device 144 is disposed at a first station 106A in the merchandise order assembly area 106 and is configured to pick up and move a first set of merchandise items 146 of various shapes, sizes, weights, etc. As stated, it is contemplated that the first robotic device 144 will handle the transfer of most of the merchandise items 146 to order containers. In one form, the first robotic device 144 may be intended to handle relatively light and/or small merchandise items 146, and therefore, the first set of merchandise items 146 may include items less than a predetermined size and/or a predetermined weight. The first robotic device 144 may be anchored to a fixed position in the merchandise order assembly area 106 or may be mounted on a mobile platform for movement within the merchandise order assembly area 106. As used herein, it should be understood that "a robotic device" is used broadly herein to generally include an automated mechanical apparatus configured to pick up and transfer merchandise items 146 and that a variety of different types of robotic devices may be used herein.

In one form, as shown in FIG. 4, the first robotic device 144 may be a robotic arm. Further, in a more particular form, it may be a six axis robotic arm (or an articulated robotic arm with six degrees of freedom). The six axes generally include: a first axis located at the robot base allowing the robot to rotate about a z-axis (or vertical axis), a second axis that allows a lower arm of the robot to move forward or backward (extending or retracting the end effector), a third axis that allows an upper arm to be raised or lowered (raising or lowering the end effector), a fourth axis that allows the upper arm to rotate in a circular motion to position the end effector, a fifth axis that allows a wrist of the robot arm to be tilted in upward and downward directions, and a sixth axis that essentially constitutes the wrist of the robot arm and can generally rotate in clockwise and/or counterclockwise directions. A six axis robotic arm has sufficient degrees of freedom to reach merchandise items 146 in different locations near it and in any of various orientations. It is generally contemplated that any of various types of six axis robotic arms may be used.

The first robotic device 144 preferably includes an end effector 145 mounted to the first robotic device 144. In FIG. 4, the type of end effector 145 mounted to the first robotic device 144 is a gripper/claw that can physically grasp the merchandise item 146, but other types of end effectors may also be used. The end effector 145 may be any of various types, shapes, and sizes, including, without limitation: grasping arms with fingers (or grippers/claws that physically grasp the merchandise item 146); suction cups (which attract the merchandise item 146 by suction); end effectors that attract the merchandise item 146 (such as by magnetism or electroadhesive/electrostatic principles); and penetrative end effectors (such as, for example, hooks that may penetrate or pierce the merchandise item 146). For the first robotic device 144, in one form, it is generally contemplated that one type of end effector (gripper/claw or suction cup) is used that can pick up and transfer most of the merchandise items

146 (the first set of merchandise items 146), and therefore, the end effector need not generally be interchanged with another one. However, in other forms, the first robotic device 144 may include multiple mounts for several different types of end effectors 145 and/or may allow for easy interchangeability of one end effector 145 for another one.

The system 100 also includes a second robotic device 147 at the merchandise order assembly area 106 configured to pick up and move a second set of merchandise items 146. It is generally contemplated that the second robotic device 147 is disposed at a second station 106B in the merchandise order assembly area 106 and is configured to pick up and move a second set of merchandise items 146. As stated, it is contemplated that the second robotic device 147 will handle the transfer of certain outlier merchandise items 146 to order containers (likely fewer items than is handled by the first robotic device 144). In one form, it may be intended to handle relatively heavy or large items, and therefore, the second set of merchandise items 146 may include items exceeding a predetermined size and/or a predetermined weight. Further, in addition to or as an alternative to these size and weight thresholds, it may be intended to handle fragile merchandise and/or merchandise with certain types of packaging material, and therefore, the second set of merchandise items 146 may include items having a predetermined type of packaging material and/or a predetermined threshold level of fragility. One example of an outlier item may, be, for example, an 18 pack of water containers. In this example, the standard suction heads or pick arms of a robotic arm 144 may not be able to get around the pack, or the robotic arm 144 may not have sufficient power or strength to lift an object of that weight from a storage container/tote.

Figure 5:
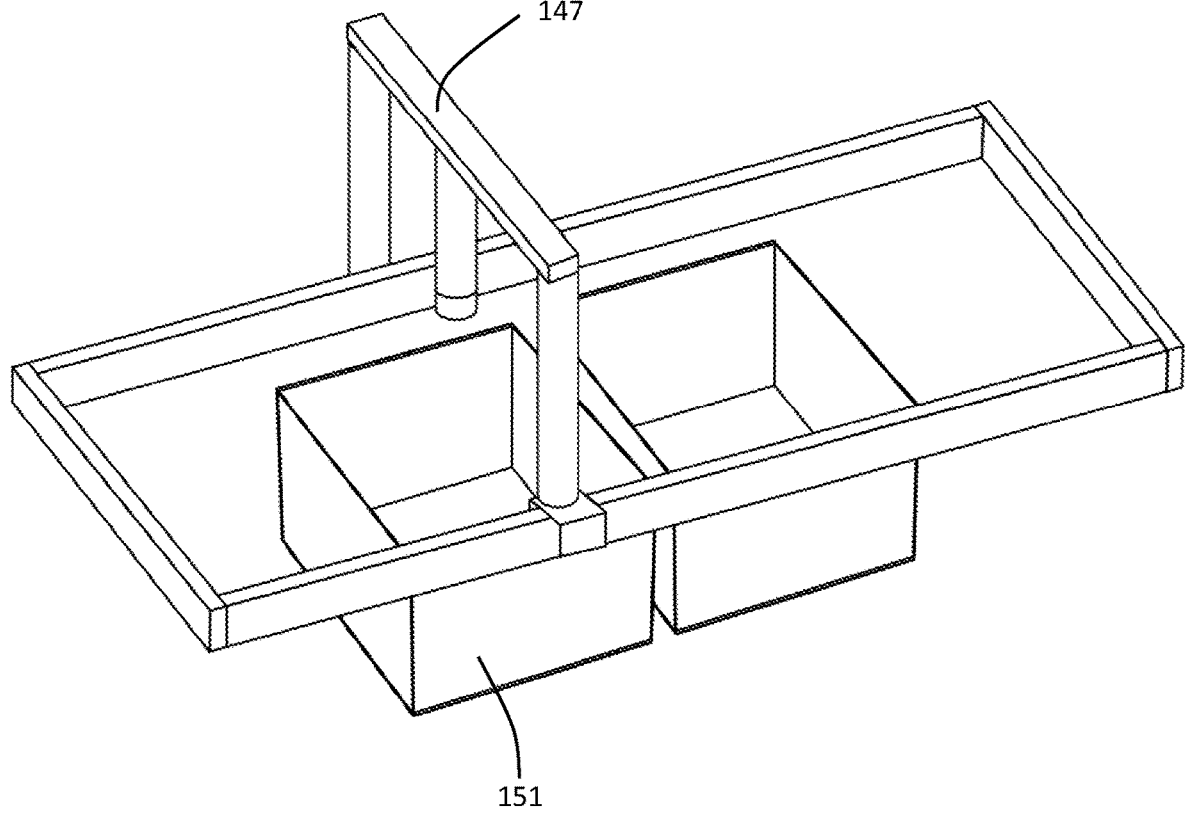
FIG. 5 is a schematic diagram in accordance with some embodiments.

Referring to FIG. 5, in one form, the second robotic device 147 may be a cartesian robot (or cartesian coordinate robot) with at least one mount for interchangeably affixing a plurality of end effectors 145. In this form, the cartesian robot 147 may be mounted for linear movement along any of three different axes (x, y, and z axes). The cartesian robot 147 includes a support structure or scaffold along one or more of the three axes to support the cartesian robot 147 during its movement and when it picks up and transfers a merchandise item 146. It is generally contemplated that any of various types of cartesian robots may be used. In FIG. 5, the cartesian robot 147 is shown mounted above order containers 151 that may receive transferred merchandise items 146 from the robot 147.

Figure 6:
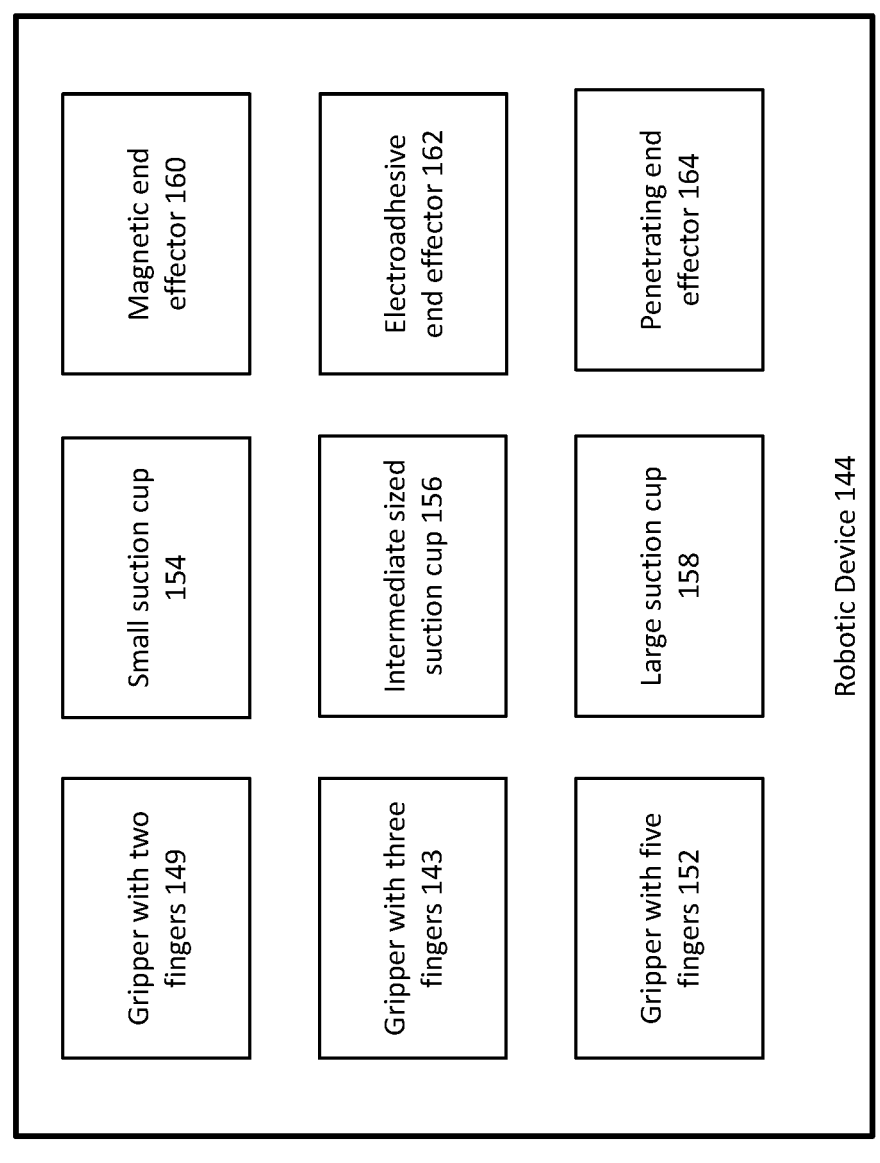
FIG. 6 is a block diagram in accordance with some embodiments.

In one form, it is generally contemplated that the second robotic device 147 may include a mount for interchangeably affixing a plurality of end effectors 145 and/or may include multiple mounts for supporting a plurality of end effectors of the same type (various grasping arms with fingers) or of different types (grasping arms with fingers and suction cups). For example, as shown in FIG. 6, the second robotic device 147 might include some or all of the following: three types of grasping arms (a grasping arm with two fingers 149, a grasping arm with three fingers 143, and a grasping arm with five fingers 152); three types of suction cups (a small suction cup 154 for light items and/or small surface areas; an intermediate sized suction cup 156; and a large suction cup 158 for heavier items and/or large surface areas); a magnetic end effector 160; an electroadhesive end effector 162; and a penetrating end effector 164. In one form, it is contemplated that the second robotic device 147 is intended to be capable of using different end effectors 145 so as to be able to handle different types of outlier items, i.e., merchandise that is relatively large, heavy, or fragile or merchandise that includes certain packaging material (or may be unusual for other reasons).

The system 100 further includes a merchandise database 150 containing a plurality of records of merchandise at the shopping facility 102. The merchandise database 150 may be designated specifically for merchandise that is subject to the automated retrieval system 104. The records identify the first set of merchandise items 146 transferable by the first robotic device 144, the second set of merchandise items 146 identified as transferable by the second robotic device 147, and a third set of merchandise items 146 identified for manual transfer. For example, in one form, each record may include a field specifically identifying these first set, second set, and manual transfer categories. In another form, the records might only identify the first and second sets, and if merchandise is identified that does include one of these two designations (or is not in the database), it will be treated as being in the manual transfer category. In yet another form, the records might only specifically identify the first set, the records for other merchandise being understood to constitute the second set, and any merchandise not in the database 150 or that cannot be identified constituting the third set.

Figure 7:
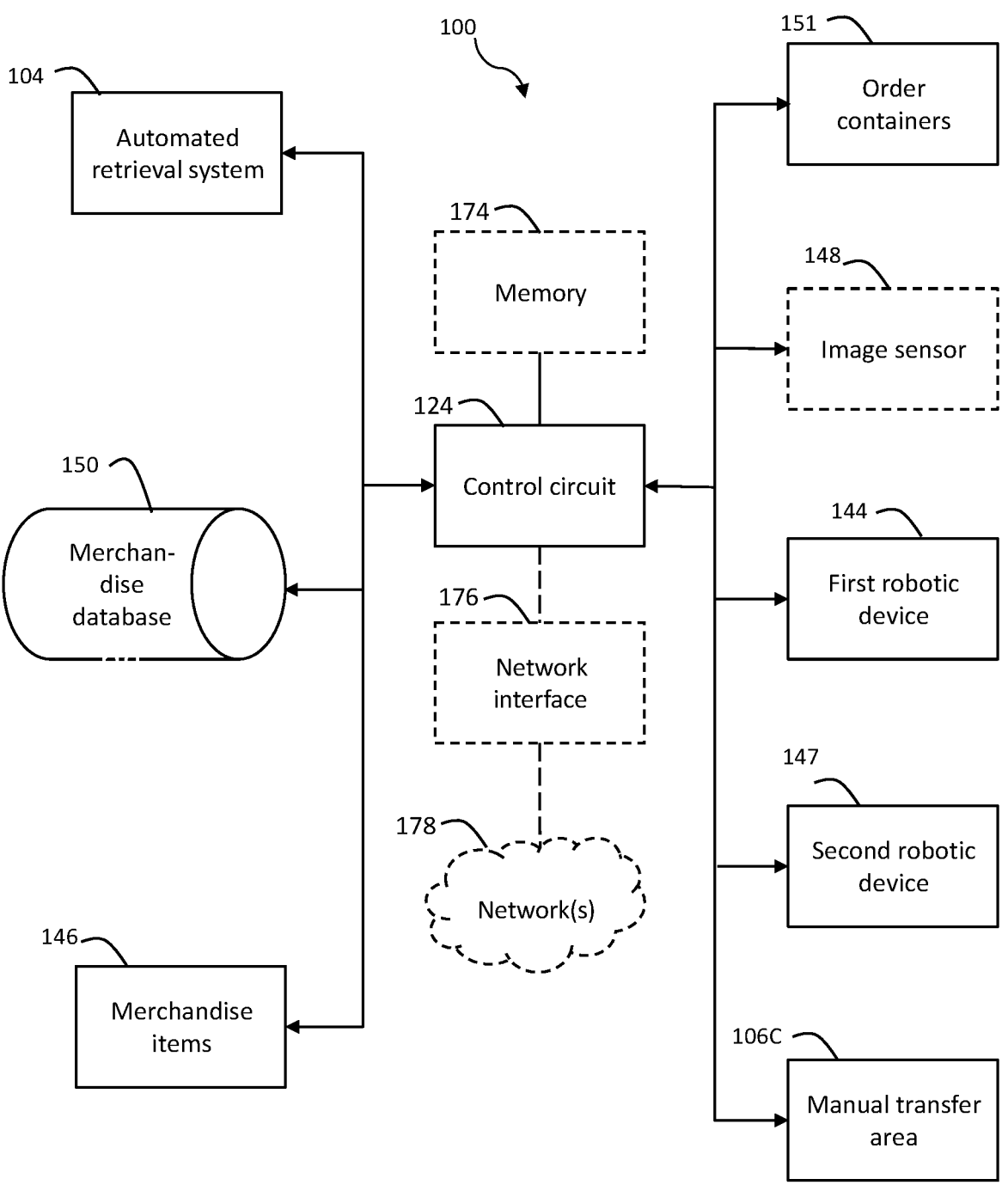
FIG. 7 is a block diagram in accordance with some embodiments.

As shown in FIG. 7, a control circuit 124 governs the operation of the system 100. The control circuit 124 may be in wireless communication with the first robotic device 144, the second robotic device 147, and the merchandise database 150. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 124 may be configured (for example, by using corresponding programming stored in a memory as will be well understood by those skilled in the art) to carry out one or more of the steps, actions, and/or functions described herein.

As shown in FIG. 7, the control circuit 124 is coupled to a memory 174 and may be coupled to a network interface 176 and network(s) 178. The memory 174 can, for example, store non-transitorily computer instructions that cause the control circuit 124 to operate as described herein, when the instructions are executed, as is well known in the art. Further, the network interface 176 may enable the control circuit 124 to communicate with other elements (both internal and external to the system 100). This network interface 176 is well understood in the art. The network interface 176 can communicatively couple the control circuit 124 to whatever network or networks 178 may be appropriate for the circumstances. The control circuit 124 may be in communication with the server of the shopping facility 102 and may make use of cloud databases and/or operate in conjunction with a cloud computing platform.

The control circuit 124 receives a merchandise order that includes one or more merchandise items 146. The merchandise order may be placed in various ways by a customer, such as, for example, an order submitted by a mobile device or other computing device. This online order may be facilitated via an application downloaded from a retailer or via the retailer's web site. This order may be received at some sort of shopping interface and then transmitted to the control circuit 124. As another example, a customer may call to place the merchandise order at a store for pick up (or possibly for delivery). The control circuit 124 may then determine a fulfillment plan for assembling the merchandise items 146 that may include determining a number of order containers 151 and/or determining an assignment and/or arrangement of the merchandise items 146 in the order containers 151.

The control circuit 124 identifies the merchandise item 146 being transported to the merchandise order assembly area 106. This identification may be accomplished in a number of ways and at various times and stages. For example, the merchandise item 146 may include some sort of identification label (such as a barcode label) that may be scanned or read at any of various locations (such as in the merchandise storage area 114, at or on the transport conveyance 118, or in the merchandise order assembly area 106). Alternatively, as another example, the merchandise item 146 may be recognized from the images captured by an image sensor 148 using image processing techniques to match the merchandise item 146 captured in the images with images of known merchandise items.

The control circuit 124 then determines, from the merchandise database 150, if the merchandise item 146 is in the first set, second set, or third set of items. As indicated above, in one form, each merchandise record may specifically identify the first, second, or third set of categories, or in another form, each record might only identify one or both of the first or second sets (with the third set being applied if a record does not include a designation, is not identified, and/or is not in the database 150). If the merchandise item 146 is in the first set of items, the control circuit 124 directs the merchandise item 146 to the first robotic device 144. If the merchandise item 146 is in the second set of items, the control circuit 124 directs the merchandise item 146 to the second robotic device 147. If the merchandise item 146 is in the third set of items, the control circuit 124 directs the merchandise item 146 to a manual transfer area 106C. In one form, the control circuit 124 may instruct transfer of the merchandise item 146 to a merchandise order container 151.

The system 100 may also include one or more image sensors 148 that are configured to capture images of a merchandise item 146 being transported to the merchandise order assembly area 106 (and possibly at the different stations in the assembly area 106). The image sensor(s) 148 may be used to facilitate transfer by the primary and/or secondary robotic devices 144, 147. For example, as shown in FIG. 4, an image sensor 148 is preferably mounted and disposed in a manner such that it is directed to capture images of the merchandise item 146 when it is in a position to be picked up by the robotic device 144. In one form, an image sensor 148 may be mounted above the transport conveyor 118 (which may be a conveyor assembly). In one form, an image sensor 148 captures and transmits images of the type of merchandise item 146 so that a determination can be made as to the designated destination of the merchandise item 146 and possibly which end effector 145 should be used to pick up the merchandise item 146 (such as, for example, by the second robotic device 147). The image sensor(s) 148 may be any of various types of cameras, video devices, or other optical instruments suitable for capturing images of and identifying the merchandise item 146.

Further, it is contemplated that the control circuit 124 may determine if a transfer at a station was successful, and if not, may instruct transfer at a different station. For example, the control circuit 124 may determine if the first robotic device 144 (the primary picker) was able to transfer a merchandise item 146, and if not, the item may then be directed to the second robotic device 147. In other words, the control circuit 124 is configured to: determine whether transfer of a merchandise item 146 in the first set of items by the first robotic device 144 was successfully completed, and if the merchandise item 146 was not successfully transferred by the first robotic device 144, it directs the merchandise item 146 to the second robotic device 147. For example, an image sensor 148 may show that the transfer at the first station 106A was not successfully completed, or the primary robotic device 144 may indicate that it was not able to maintain contact with the merchandise item 146 via its end effector 145 to successfully accomplish the transfer. So, in the example of FIG. 1, if the transfer at the first station 106A is not successful, the merchandise item 146 may be carried along the conveyor assembly 118 to the second station 106B.

The control circuit 124 may then determine if the transfer by the second robotic device 147 at the second station 106B is successfully completed. The control circuit 124 may determine if the second robotic device 147 is able to transfer the merchandise item 146, and if not, the item may be directed to the third station (or manual transfer area 106C). In other words, the control circuit 124 is configured to: determine whether transfer of the merchandise item 146 by the second robotic device 147 was successfully completed; and if the merchandise item 146 was not successfully transferred by the second robotic device 147, it directs the merchandise item 146 to the manual transfer area 106C. Again, as above, an image sensor 148 may show that the transfer at the second station 106B was not successfully completed, or the secondary robotic device 147 may indicate that it was not able to maintain contact with the merchandise item 146 via its end effector 145 to successfully accomplish the transfer. So, in the example of FIG. 1, if the transfer at the second station 106B is not successful, the merchandise item 146 may be carried along the conveyor assembly 118 to the third station 106C.

Further, it is generally contemplated that the first, second, and third sets of merchandise items 146 may be continually updated based on experience. In one form, the control circuit 124 may reassign the merchandise items 146 to different sets based on the failure of the robotic devices 144, 147. In other words, the control circuit 124 may be configured to: if a merchandise item 146 in the first set of items was successfully transferred by the second robotic device 147 (after failure by the first robotic device 144), reassign the merchandise item 146 to the second set of items; and if the merchandise item 146 in the first set of items was not successfully transferred by either the first or second robotic devices 144, 147, then reassign the merchandise item 146 to the third set of merchandise items 146. Similarly, the control circuit 124 may reassign merchandise items 146 that are designated for the second set to the third set. In other words, the control circuit 124 may be configured to: determine whether transfer of a merchandise item 146 in the second set of items by the second robotic device 147 was successfully completed; and if the merchandise item 146 was not successfully transferred by the second robotic device 147, then direct the merchandise item 146 to the manual transfer area 106C and reassign the merchandise item 146 to the third set of merchandise items 146.

It is generally contemplated that "failure" may be measured in various ways. For example, reassignment may occur when a certain threshold number of failures is reached or when failures exceed a certain threshold rate of failures. It is also contemplated that a more sophisticated machine learning approach may be used to reassign merchandise items 146 to different sets. For instance, a supervised learning approach may be used to predict the performance of the first and second robotic devices 144, 147 for merchandise items 146 with similar characteristics, i.e., similar size, weight, fragility, and/or packaging material. Accordingly, in one form, it is contemplated that information regarding actual performance (successes and failures) with respect to a specific merchandise item 146 is used to continually adjust the approach for selection of the robotic devices 144, 147 for that item. Additionally, however, the selection of robotic devices 144, 147 may also involve predictions and forecasting based on the similarity of characteristics of various merchandise items 146 (in the absence of or in addition to performance information).

In one form, it is also contemplated that the system 100 may proceed in a certain predetermined order of sets of merchandise items 146. For example, the merchandise items 146 may be handled in the following order: (1) merchandise items 146 in the first set and intended for the first robotic device 144; (2) followed by merchandise items 146 in the second set and intended for the second robotic device 147; and (3) followed by merchandise items 146 in the third set (or any remaining items) and intended for the manual transfer area 106C. In other words, the control circuit 124 may be configured to: determine the merchandise items 146 that are in each category of the first set, the second set, and the third set of merchandise items 146; instruct transport of each item of the first set of items to the merchandise order assembly area 106; following transport of each item of the first set of items, instruct transport of each of the second set of items to the merchandise order assembly area 106; and following transport of each item of the first and second sets of items, instruct transport of each item of the third set of items (or the remaining items) to the merchandise order assembly area 106.

Although this disclosure has generally described a first station 106A with a first robotic device 144, a second station 106B with a second robotic device 147, and a third manual transfer station 106C, it should be understood that this disclosure is not limited to these three types of stations. More specifically, it is further contemplated that additional stations and robotic devices may be used. As stated above, in one form, the second robotic device 147 may be intended to handle relatively large, heavy, fragile, and/or packaged merchandise. However, it is further contemplated that a separate robotic device may be directed to one or more of each of these characteristics. In this example, if a separate robotic device is directed to each characteristic, there would be four such robotic devices.

Figure 8:
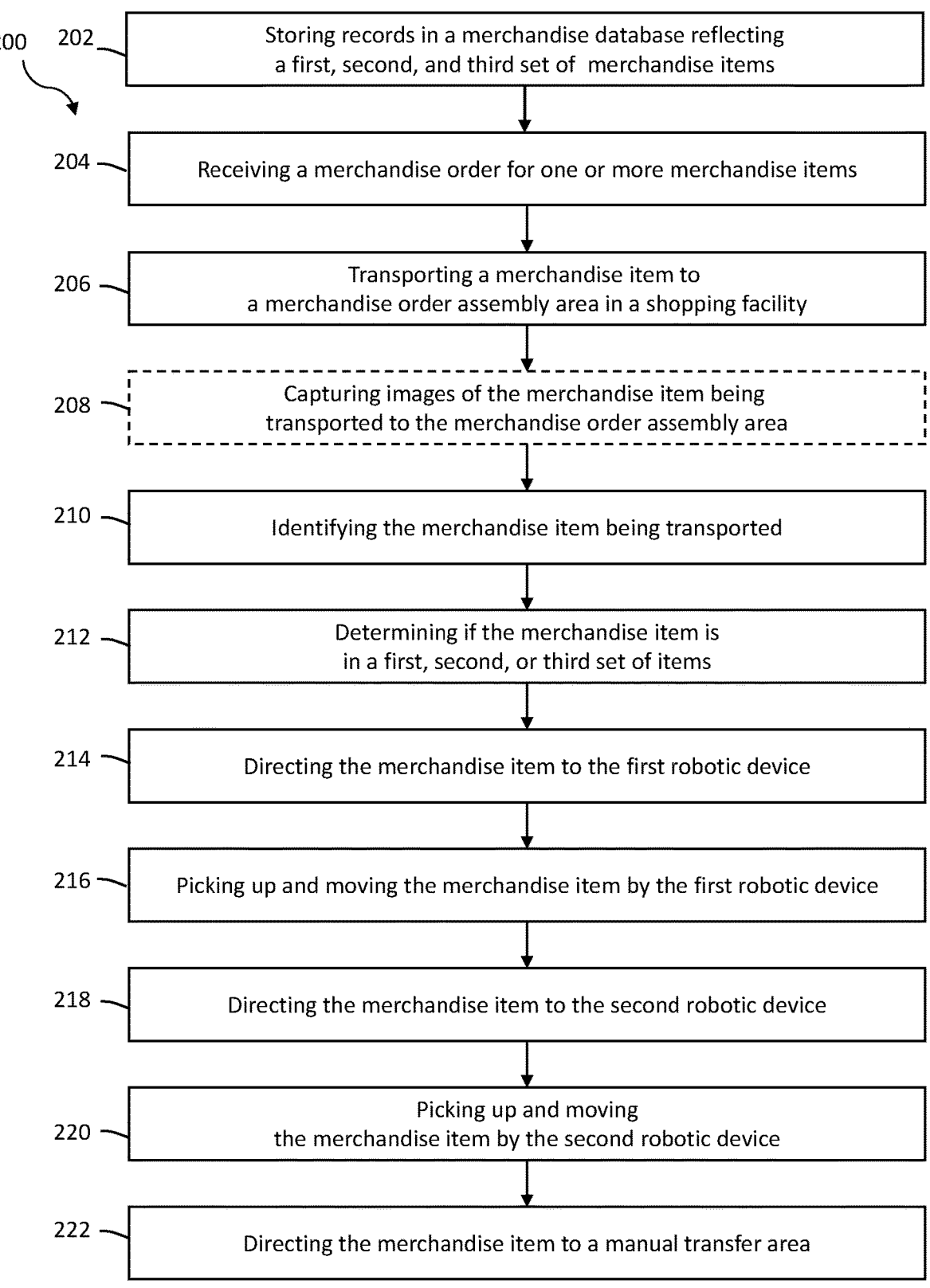
FIG. 8 is a flow diagram in accordance with some embodiments.

Referring to FIG. 8, there is shown a process 200 for picking up and transferring a variety of different types of merchandise in shopping facilities. In one form, the process 200 may be used to facilitate assembly of an order placed by a customer for pick up at a shopping facility. It is generally contemplated that the process 200 may use some or all of the components described above with respect to system 100.

At block 202, records of some or all of the merchandise located at the shopping facility are stored. It is generally contemplated that that this action may be performed prior to the assembly of any order and may be updated on a regular basis thereafter. The records generally identify a first set of merchandise items transferable by a first robotic device, a second set of merchandise items identified as transferable by a second robotic device, and a third set of merchandise items identified for manual transfer. In one form, for example, each record may specifically identify these first set, second set, and manual transfer categories. In another form, the records might only identify the first and second sets, and if merchandise does not include one of these two designations (or is not in the database), it may be treated as being in the manual transfer category.

At block 204, a merchandise order including one or more merchandise items is received. The merchandise order may be placed in various ways by a customer. For example, in one form, an order may be submitted by a mobile device or other computing device, and this order may be facilitated via an application downloaded from a retailer or via the retailer's website. This order may be received at some sort of shopping interface of the retailer.

At block 206, merchandise is transported to one or more merchandise order assembly areas in a shopping facility. It is generally contemplated that the shopping facility includes one or more merchandise order assembly areas with several stations for assembly of part or all of a merchandise order. Further, it is generally contemplated that some or all of the merchandise in the order may be transported by an automated retrieval system at the shopping facility to the one or more merchandise order assembly areas. In one form, some or all of the merchandise in the order may be transported from a merchandise storage area to the merchandise order assembly areas. Further, in one form, the merchandise may be transported in storage containers (or storage totes).

At block 208, optionally, images of a merchandise item being transported to the merchandise order assembly area may be captured by one or more image sensors. Images may be captured at the different stations in the merchandise order assembly area to facilitate transfer by the first and second robotic devices. In one form, an image sensor 148 may capture and transmit images of the type of merchandise item for identification purposes.

At block 210, the merchandise item being transported is identified. It is generally contemplated that the merchandise item is identified at one of various stages and in various ways. For example, a barcode or other identification label may be scanned or read at any of various locations (such as at a merchandise storage area, at or on a transport conveyance, or at the merchandise order assembly area). Alternatively, as another example, the merchandise item may be identified base on the images captured by the image sensor.

At block 212, it is determined if the merchandise item is in a first, second, or third set of items. It is generally contemplated that this determination will then govern which station will receive the merchandise item. At block 214, if the merchandise item is in the first set of items, it is directed to a first station, i.e., to the first robotic device. At block 216, the merchandise item is picked up and moved to an order container by the first robotic device. At block 218, if the merchandise item is in the second set of items, it is directed to a second station, i.e., to the second robotic device. At block 220, the merchandise item is picked up and moved to an order container by the second robotic device. At block 222, if the merchandise item is in the third set of items, it is directed to a third station, i.e., to the first robotic device. It is generally contemplated that the merchandise items is then picked up and moved to an order container by an individual.

Figure 9:
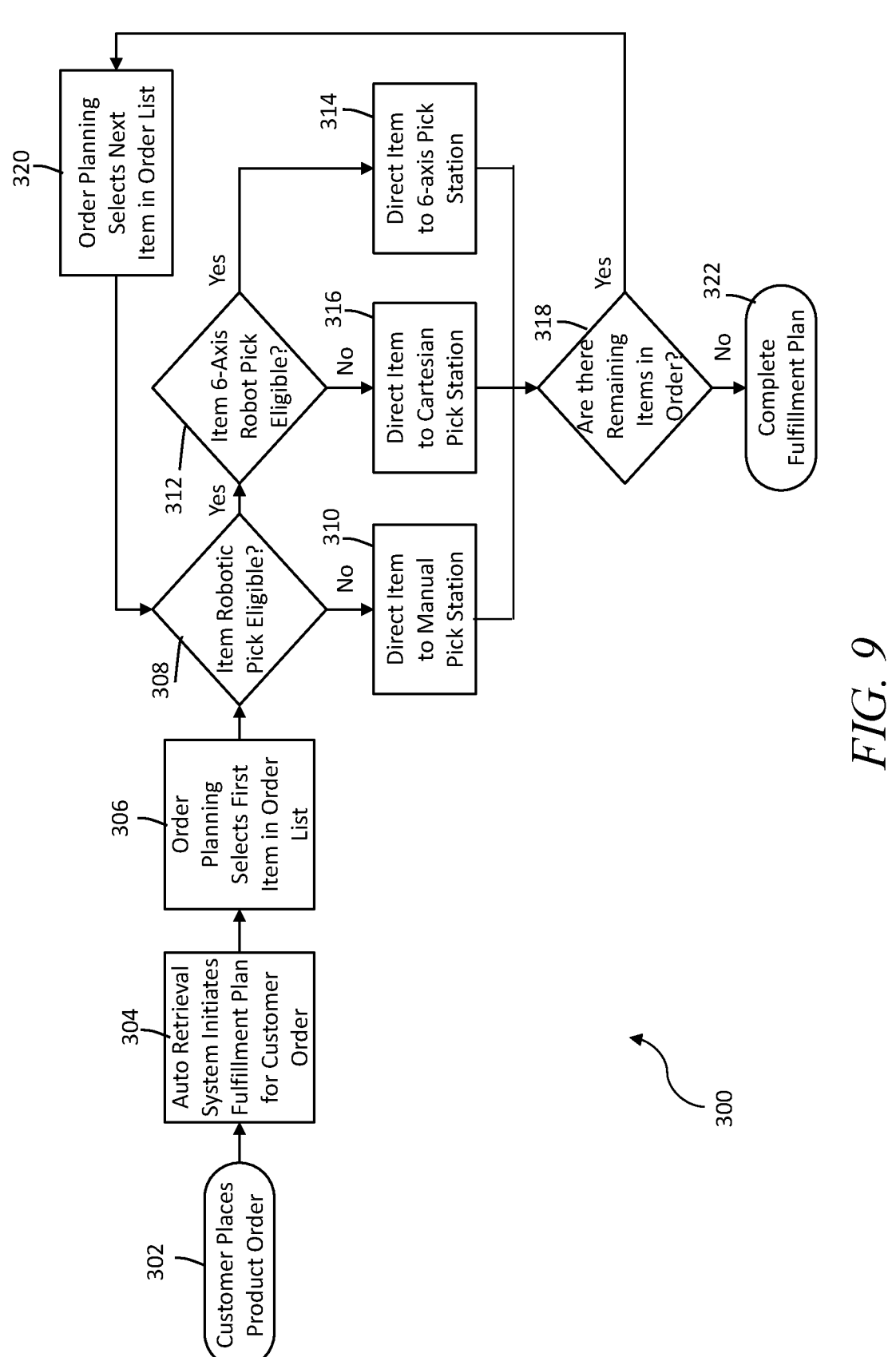
FIG. 9 is a flow diagram in accordance with some embodiments.

Referring to FIG. 9, there is shown a process 300 for picking up and transferring a variety of different types of merchandise. This process 300 illustrates a slightly different approach to decision making than process 200. It is generally contemplated that process 300 may use some or all of the components described above with respect to system 100, and the description of system 100 and process 200 are incorporated herein.

At block 302, a merchandise order for one or more merchandise items is received. It is generally contemplated that a customer will place the order for pick up by the customer at a shopping facility, although it is also possible that the order will be delivered to the customer. The customer may place the order in any of various ways described above.

At block 304, an automated retrieval system initiates a fulfillment plan for the customer's order. It is generally contemplated that the fulfillment plan may include determining what merchandise items in the merchandise order are readily available at the shopping facility and what items may have to be retrieved from offsite locations, such as other retail stores and distribution centers. The fulfillment plan may also involve determining what merchandise items are in the automated retrieval system and what merchandise items may have to be retrieved manually, i.e., by employees at the shopping facility. Further, the fulfillment plan may involve determining the assignment of merchandise items to order containers and possibly the arrangement of merchandise items therein. With respect to process 300, the fulfillment plan refers to merchandise items that are subject to the automated retrieval system and that are capable of picking or transfer in that system.

At block 306, for the merchandise items that are subject to the automated retrieval system, a first item on the merchandise order list is selected. It is generally contemplated that this first item (and subsequent items) may be selected in various ways. For example, items may be selected based on the order they were placed by the customer, they may be selected randomly, they may be selected by category (first, second, or third sets of items), etc.

At block 308, a determination is made as to whether this item is eligible for picking by a robotic device. In other words, it is determined whether the item is capable of transfer by one of the robotic devices. This determination may also be performed in various ways. Under one approach, a merchandise database may be accessed to determine if the item has been designated as capable of transfer by a robot, i.e., it is in the first or second set of items. Under another approach, an image of the merchandise item may be captured, and a determination as to robot eligibility may be made based on the captured image(s).

At block 310, if the item is not eligible for transfer by a robotic device, it is directed to the manual pick station. In other words, it is directed to a manual transfer area where an employee or other individual can transfer the merchandise item. In one form, this manual transfer area may be a default or catchall area for merchandise that includes no designation in the merchandise database, that is not stored in the merchandise database at all, that cannot be identified by scanning or image capture, etc.

At block 312, if the item is eligible for transfer by a robotic device, a determination is made as to whether the item is eligible for picking by a 6-axis robot. In some forms, as addressed above, it is contemplated that most of the merchandise items will be capable of transfer by the 6-axis robot. Further, it is contemplated that the item has been identified at some stage of the process, such as by scanning a barcode or by image capture. The determination of 6-axis robot eligibility may then be made based on a designation in a merchandise database, i.e., it has been designated as one of the first set of items. At block 314, if the item is eligible for transfer by the 6-axis robot, the item is directed to the 6-axis pick station.

If it is not (i.e., it has not been designated as one of the first set of items), the process 300 advances to block 316. At block 316, the item is directed to the cartesian pick station. As addressed above, in one form, it is contemplated that relatively few merchandise items will be intended for transfer by the cartesian robotic device. It is contemplated that this cartesian robotic device may be used for merchandise items with certain characteristics, such as, for example, relatively large items, heavy items, fragile items, and/or items with certain packaging material.

Once an item is picked, i.e., transferred, the process 300 moves from blocks 310, 314, and 316 to block 318. At block 318, a determination is made if there are any remaining items in the merchandise order. If so, at block 320, the next item on the merchandise order list is selected, and the process 300 moves to block 308. The process 300 then repeats the steps from block 308 onwards until no further merchandise items remain. At block 322, when there are no remaining merchandise items, the fulfillment plan is completed.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for picking up and transferring a variety of different types of merchandise items in shopping facilities, the system comprising:
a shopping facility comprising at least one merchandise order assembly area configured for assembly of part or all of a merchandise order;
an automated retrieval system configured to transport merchandise items to the at least one merchandise order assembly area;
a robotic arm at the at least one merchandise order assembly area configured to pick up and move a first set of merchandise items, the first set of merchandise items comprising items less than at least one of a predetermined size threshold and a predetermined weight threshold;
a cartesian robot with a mount for interchangeably affixing a plurality of end effectors, the cartesian robot at the at least one merchandise order assembly area configured to pick up and move a second set of merchandise items, the second set of merchandise items comprising items equal to or exceeding at least one of the predetermined size threshold and the predetermined weight threshold;
a merchandise database containing a plurality of records of merchandise items at the shopping facility, the plurality of records identifying the first set of merchandise items as transferable by the robotic arm, the second set of merchandise items as transferable by the cartesian robot, and a third set of merchandise items for manual transfer;
a control circuit communicatively coupled to the robotic arm, the cartesian robot, and the merchandise database, the control circuit to:
receive the merchandise order;
identify a merchandise item being transported to a merchandise order assembly area;
determine, from the merchandise database, if the merchandise item is in the first set, second set, or third set of items;
if the merchandise item is in the first set of items, direct the merchandise item to the robotic arm;

if the merchandise item is in the second set of items, direct the merchandise item to the cartesian robot; and
if the merchandise item is in the third set of items, direct the merchandise item to a manual transfer area.

2. The system of claim 1, further comprising at least one image sensor configured to capture images of each of the merchandise items being transported to the at least one merchandise order assembly area.

3. The system of claim 1, wherein the automated retrieval system comprises:
a plurality of containers configured to contain merchandise items in a merchandise storage area in the shopping facility; and
a transport conveyance configured to transport containers between the merchandise storage area and the merchandise order assembly area.

4. The system of claim 3, wherein the transport conveyance comprises at least one of a conveyor assembly and an autonomous ground vehicle.

5. The system of claim 1, wherein the control circuit is to:
determine whether transfer of a merchandise item in the first set of items by the robotic arm was successfully completed; and
if the merchandise item was not successfully transferred by the robotic arm, direct the merchandise item to the cartesian robot.

6. The system of claim 5, wherein the control circuit is to:
determine whether transfer of the merchandise item by the cartesian robot was successfully completed; and
if the merchandise item was not successfully transferred by the cartesian robot, direct the merchandise item to the manual transfer area.

7. The system of claim 6, wherein the control circuit is to:
if the merchandise item in the first set of items was successfully transferred by the cartesian robot, reassign the merchandise item to the second set of items; and
if the merchandise item in the first set of items was not successfully transferred by either the robotic arm or the cartesian robot, reassign the merchandise item to the third set of merchandise items.

8. The system of claim 7, wherein the control circuit is to:
determine whether transfer of a merchandise item in the second set of items by the cartesian robot was successfully completed; and
if the merchandise item was not successfully transferred by the cartesian robot, direct the merchandise item to the manual transfer area and reassign the merchandise item to the third set of merchandise items.

9. The system of claim 1, wherein the control circuit is to:
determine the merchandise items that are in each category of the first set, the second set, and the third set of merchandise items;
instruct transport of each item of the first set of items to the at least one merchandise order assembly area;
following transport of each item of the first set of items, instruct transport of each of the second set of items to the at least one merchandise order assembly area; and
following transport of each item of the first and second sets of items, instruct transport of each item of the third set of items to the at least one merchandise order assembly area.

10. The system of claim 1, wherein the second set of merchandise items further comprises merchandise items with a predetermined packaging material.

11. The system of claim 1, wherein the plurality of end effectors comprises at least two end effectors selected from suction cups or arrays, grippers, hooks, or magnets.

12. The system of claim 1, wherein the automated retrieval system comprises a conveyor assembly, the robotic arm and the cartesian robot being disposed along the conveyor assembly.

13. The system of claim 12, wherein the robotic arm is disposed at a first position along the conveyor assembly and the cartesian robot is disposed at a second position along the conveyor assembly, the first position being upstream of the second position.

14. The system of claim 13, wherein the control circuit is to:

determine a failure rate for at least one of the plurality of end effectors of the cartesian robot;

compare the failure rate to a failure rate threshold; and instruct replacement of the at least one of the plurality of end effectors when the determined failure rate exceeds the failure rate threshold.

15. A method for picking up and transferring a variety of different types of merchandise items in shopping facilities, the method comprising:

by an automated retrieval system, transporting merchandise items to at least one merchandise order assembly area at a shopping facility, the at least one merchandise order assembly area configured for assembly of part or all of a merchandise order;

by a robotic arm at the at least one merchandise order assembly area, picking up and moving a first set of merchandise items, the first set of merchandise items comprising items less than at least one of a predetermined size threshold and a predetermined weight threshold;

by a cartesian robot with a mount for interchangeably affixing a plurality of end effectors at the at least one merchandise order assembly area, picking up and moving a second set of merchandise items, the second set of merchandise items comprising items equal to or exceeding at least one of the predetermined size threshold and the predetermined weight threshold;

storing in a merchandise database a plurality of records of merchandise items at the shopping facility, the plurality of records identifying the first set of merchandise items as transferable by the robotic arm, the second set of merchandise items as transferable by the cartesian robot, and a third set of merchandise items for manual transfer;

by a control circuit:

receiving the merchandise order;

identifying a merchandise item being transported to a merchandise order assembly area;

determining, from the merchandise database, that the merchandise item is in the first set, second set, or third set of items;

directing merchandise items in the first set of items to the robotic arm;

directing merchandise items in the second set of items to the cartesian robot; and directing merchandise items in the third set of items to a manual transfer area.

16. The method of claim 15, further comprising, by at least one image sensor, capturing images of each of the merchandise items being transported to the at least one merchandise order assembly area.

17. The method of claim 15, wherein the automated retrieval system comprises:

a plurality of containers configured to contain merchandise items in a merchandise storage area in the shopping facility; and a transport conveyance configured to transport containers between the merchandise storage area and the merchandise order assembly area.

18. The method of claim 17, wherein the transport conveyance comprises at least one of a conveyor assembly and an autonomous ground vehicle.

19. The method of claim 15, further comprising, by the control circuit:

determining whether transfer of a merchandise item in the first set of items by the was successfully completed; and directing merchandise items not successfully transferred by the robotic arm to the cartesian robot.

20. The method of claim 19, further comprising, by the control circuit:

determining whether transfer of the merchandise item by the cartesian robot was successfully completed; and directing merchandise items not successfully transferred by the cartesian robot to the manual transfer area.

21. The method of claim 20, further comprising, by the control circuit:

reassigning merchandise items in the first set of items successfully transferred by the cartesian robot to the second set of items; and reassigning merchandise items in the first set of items not successfully transferred by either the robotic arm or the cartesian robot to the third set of merchandise items.

22. The method of claim 21, further comprising, by the control circuit:

determining whether transfer of a merchandise item in the second set of items by the cartesian robot was successfully completed; and directing merchandise items not successfully transferred by the cartesian robot to the manual transfer area and reassigning the merchandise item to the third set of merchandise items.

* * * * *